Dec. 16, 1958 C. C. HUTCHINS ET AL 2,864,986
ELECTRIC MOTOR
Filed June 15, 1953 2 Sheets-Sheet 1

INVENTORS.
CHARLES C. HUTCHINS
& BLAIR C. SEAMAN
BY
ATTORNEYS

Dec. 16, 1958   C. C. HUTCHINS ET AL   2,864,986
ELECTRIC MOTOR
Filed June 15, 1953   2 Sheets-Sheet 2

INVENTORS.
CHARLES C. HUTCHINS
& BLAIR C. SEAMAN
BY
ATTORNEYS

United States Patent Office 2,864,986
Patented Dec. 16, 1958

2,864,986
ELECTRIC MOTOR

Charles C. Hutchins and Blair C. Seaman, Ridgway, Pa., assignors to Hutchins Electric Company, Inc., Ridgway, Pa., a corporation of Pennsylvania Application June 15, 1953, Serial No. 361,564

6 Claims. (Cl. 318—220)

This invention relates to electric motors and, more particularly, to motors of the single phase variety which are arranged to be started by the so-called phase splitting action.

Heretofore it has been considered that the phase splitting action must be secured by the inclusion of extra resistance and/or inductance and/or capacitance unequally distributed between two winding sections each connected to the line and arranged on the face of the stator core, in slots or otherwise, in a selected angular space displacement. The most usual displacement angle is chosen as 90 electrical degrees. However, other angular spacings are sometimes used.

When extra external resistance, inductance or capacity is absent and the motor arranged with the the proper winding proportions to take advantage of selected internal distribution of the two circuits, the machine is commonly known as a split phase motor. Normally the proportions take the form of one winding of relatively high resistance and low reactance while the second winding, spaced from the first by a selected angle in electriacl degrees, is commonly arranged with low resistance and high reactance. A switch or relay removes the high resistance winding from the line when the motor has reached partial speed to prevent excessive circulating current from burning out the windings.

Such machines are subject to the objection that the fine wire of the high resistance winding is difficult to handle during manufacture as well as having very low thermal capacity and the net result is a motor lacking in ruggedness and one not particularly capable of withstanding abuse. This factor of lacking ruggedness is responsible for many motor failures and consequent high service expense.

In our copending patent application, Serial No. 250,276, filed October 8, 1951, there is described an arrangement for providing high starting torque without the use of a high reactance within the machine and without the use of means external to the windings of the machine for producing a displacement between the currents flowing in the windings.

It is an object of the present invention to provide a motor employing simplified windings and operating by inductance transfer between the windings wherein a portion of the windings is short-circuited during the starting cycle and the short-circuit is removed by means such as a relay or switch after the motor has attained approximately 80 to 90% of its normal operating speed.

It is a further object of this invention to provide an improved motor winding which permits a reduction in the cost of winding labor and, while it sacrifices some slight percentage of available torque as compared to other winding arrangements, it provides a desirable high degree of ruggedness.

These and other objects of the invention will become apparent from the following description when read in conjunction with the accompanying drawings, in which.

Figure 1:
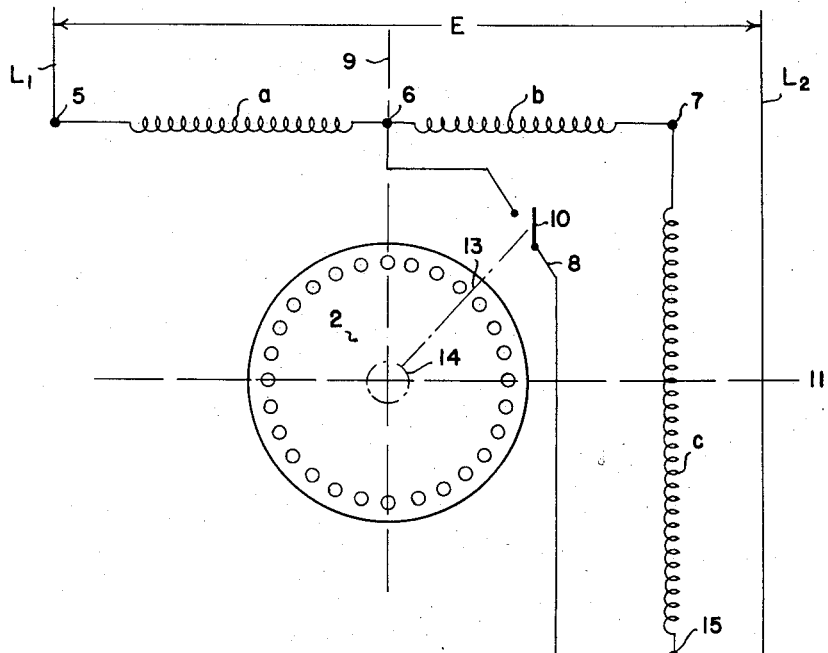
Figure 1 is a conventional motor diagram showing windings connected in accordance with this invention.
Figure 2:
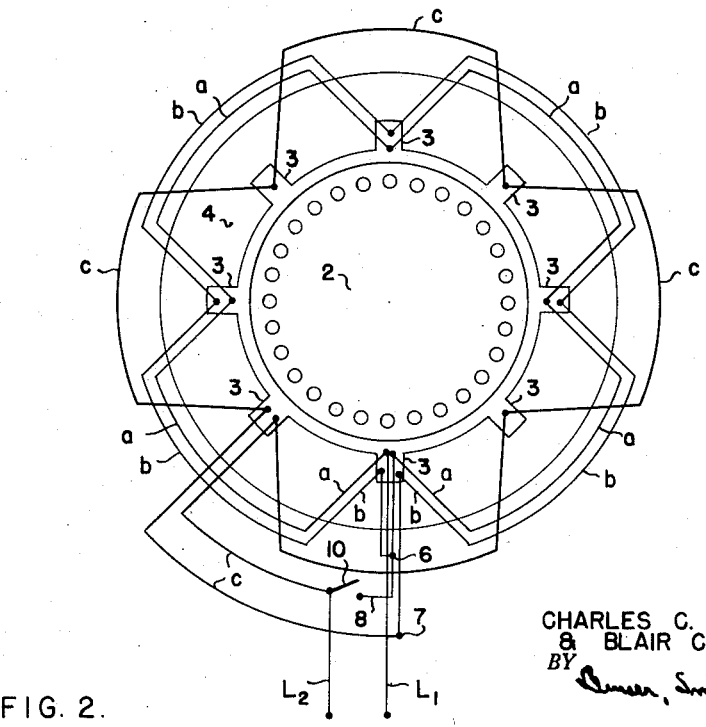
Figure 2 is a conventional showing of motor windings arranged in accordance with the diagram of Figure 1.

In Figures 1 and 2 there is shown a squirrel cage rotor 2 which may be in the form of any of the various types of squirrel cage rotors. The rotor is surrounded by windings shown diagrammatically in Figure 1, as $a$, $b$ and $c$. Windings $a$ and $b$ are positioned on the axis 9 of the motor and are connected in series with each other at a common point 6. The winding $c$ is shown as positioned on the axis 11 of the motor 90 electrical degrees from the windings $a$ and $b$ and is connected in series with the winding $b$ at a common point 7.

The outer end 15 of the $c$ winding is connected back through a short-circuiting lead 8 to the common point 6 of the windings $a$ and $b$. The short-circuiting lead contains a switch 10 which is actuated through control means indicated schematically by the construction line 13 from centrifugal mechanism 14 mounted on the motor 2. This type of centrifugal cutout switch is well known in the art. It will be evident that the switch 10 may be actuated by other well known means in addition to a conventional centrifugal device and opened thereby as the motor approaches normal operating speed.

The outer end 15 of the $c$ winding is connected to power supply line L1 and the outer end 5 of the $a$ winding is connected to the power supply line L1.

In Figure 2 these windings are shown disposed in conventional winding slots 3 in a stator framework 4. The outer end of the $a$ winding is connected to L1 and the inner end of the $a$ winding is connected to the $b$ winding. The windings are shown diagrammatically as a single line passing from slot to slot around the stator frame. It will be evident that these loops are representative of coils composed of a plurality of turns and are disposed in a plurality of slots in spiral, lap or other conventional coil arrangement as may be desirably employed with any particular motor. The $c$ winding is connected between L2 and the end 7 of the $b$ winding.

The $a$ winding is wound over part of each of the pole faces in a manner similar to a normal main running winding but with a fewer number of conductors than would ordinarily be required for a main winding. The $b$ winding is wound in the same slots as the $a$ winding with a similar distribution and with a number of conductors which may be more or less than those of the $a$ winding depending upon the specific motor characteristics desired. The $c$ winding is wound at an electrical space angle to the $a$ and $b$ windings. This space angle is generally, but not necessarily, 90 degrees and the phase displacement provided between the currents flowing in the $a$ and $c$ windings, as will be described, is selected with regard to this angle, and must be sufficient that the $a$ and $c$ windings are substantially non-inductive with respect to each other except, of course, insofar as inductance is effected through the rotor. All of the windings are connected in series and the total number of effective conductors is the sum of the conductors of winding $a$ plus winding $b$ plus winding $c$. In this form of the invention line voltage will be applied across L1 and L2 as indicated by the letter E.

During motor starting the switch 10 will be closed short-circuiting windings $b$ and $c$ and applying full line voltage across the winding $a$. The current flowing in the $a$ winding establishes a flux linking the $b$ winding thus setting up a voltage in the $b$ winding by transformer action which in turn causes a current to flow through the $b$ and $c$ windings and the short-circuiting lead 8. Thus the current in the $b$ and $c$ windings is out of phase with the current in the $a$ winding and the interaction of these two currents upon the motor rotor is of sufficient magnitude to produce a substantial starting torque as well as a substantial torque during acceleration.

As the motor aproaches normal operating speed, the centrifugally operated switch 10 is opened thus removing the short-circuit from across the $b$ and $c$ windings. Thereafter the motor operates as a conventional single phase motor with the $a$, $b$ and $c$ windings in series connection and with the $a$ and $b$ windings disposed at 90 electrical degrees from the $c$ winding.

Figure 3:
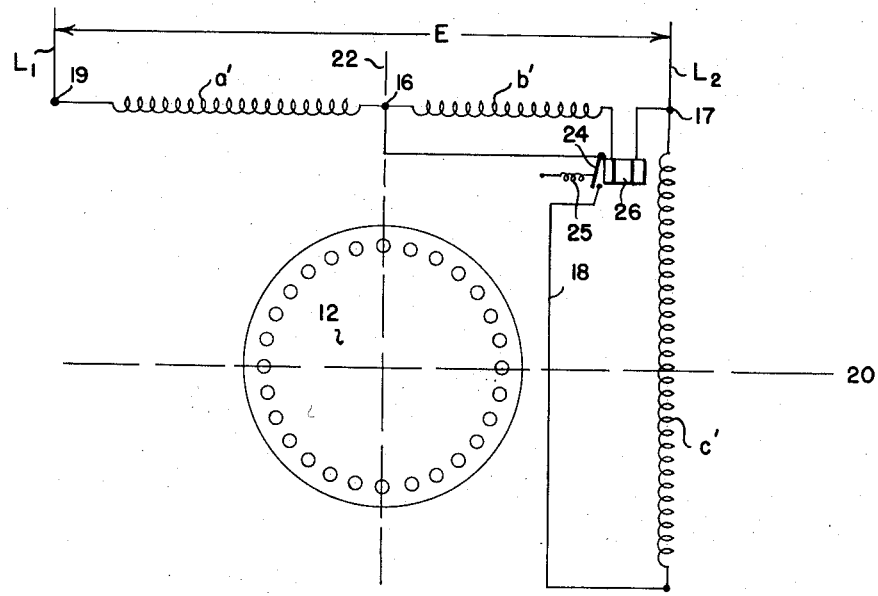
Figure 3 is a conventional motor diagram showing an alternate form of windings constructed in accordance with this invention.
Figure 4:
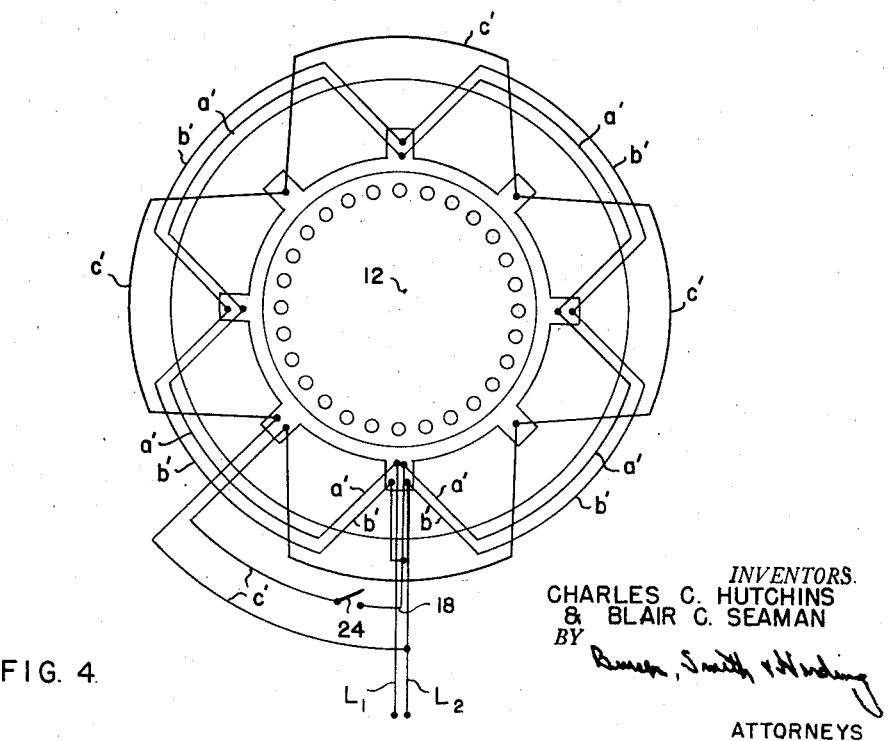
Figure 4 is a conventional showing of motor windings arranged in accordance with the diagram of Figure 3.

In Figures 3 and 4 there is shown an alternate form of motor constructed in accordance with this invention in which there is provided a squirrel cage rotor 12. The rotor is surrounded by windings shown as $a'$, $b'$ and $c'$. The $a'$ and $b'$ windings are connected in series across the axis 22 and the $c'$ winding is positioned at 90 electrical degrees therewith across the axis 20 with one end of the $c'$ winding being connected to the end of the $b'$ winding not connected to the $a'$ winding. A short-circuiting lead 18 is connected between the junction point 16 of the windings $a'$ and $b'$ and the outer end of the winding $c'$. The short-circuiting lead is provided with a contact 24 which is adapted to close the short-circuit in response to energization of a solenoid coil 26 which is connected in series with the $a'$—$b'$ winding. This form of the motor is connected to power across lines L1 and L2 which are connected to the outer end 19 of the $a'$ winding and the junction point 17 between the $b'$ and $c'$ windings, respectively. Thus in this form of the invention, the windings $a'$, $b'$ and $c'$ are connected in series and the $a'$ and $b'$ windings are connected in series across the source of power.

In this form of the invention as well as in that form of the invention described in connection with Figure 1 the transformer action between the $a'$ and $b'$ winding induces a circulating current through the $b'$ winding, the $c'$ winding and the short-circuiting lead 18. In this form of the invention the circulating current in the $b'$ and $c'$ windings is out of phase with the current in the $a'$ winding which in this form of the invention also flows through the $b'$ winding. The interaction upon the motor rotor of the fields produced by these two currents produces motor starting torque. As the motor comes up to speed and the circulating current as well as the current in the $a'$ winding decreases, the short-circuiting lead 18 will be opened when the magnetic field generated by the solenoid coil 26 is insufficient to close in the contact switch 24 against the urging of a spring 25. While the solenoid 26 has been shown here in series with the $a'$ and $b'$ windings, it will be evident that the coil may be variously connected. For example, it may equally well be connected to operate on the current drawn by the $a'$ winding alone and provide a satisfactory operation. It will also be evident that the motor arrangement shown in Figure 1 may employ a solenoid control relay such as described in connection with Figure 3 in order to interrupt the short-circuit and, similarly, that the arrangement shown in Figure 3 may employ a centrifugally controlled switch to interrupt the short-circuit.

Certain distinctions should be noted between the motor disclosed herein and a conventional shaded pole motor. In a shaded pole motor the trailing section of the pole, with respect to motor rotation, is surrounded by a heavy copper band which is provided to delay the flux changes in the trailing section of the pole. The shaded pole motor rotates toward the short-circuited pole section. In the motor described herein the short-circuited windings receive their voltage by induction, and the current in the short-circuited windings leads the current in the main winding section due to the fact that the resistance-reactance ratio of the short-circuted windings is reversed as compared to that of the main winding because of the ratio between the turns of the main winding and the short-circuited windings. Hence this motor rotates from the short-circuited windings to the main winding. This is opposite to the action of a shaded pole motor.

From the foregoing, it will be evident that this invention provides for an internal arrangement of the windings of an electric motor in which the mutual reactance is so established as to provide phase splitting by relative induction between windings. At the same time the invention provides a motor utilizing only relatively heavy section copper windings thus providing an inexpensive and rugger motor of improved reliability.

It is further noted that this winding arrangement provides a motor employing less copper than any other motor capable of equal performance insofar as running efficiency is concerned and having extreme ruggedness insofar as thermal capacity is concerned. This will become evident when it is considered that in a conventional type of motor the main running winding might possess, for example, 30 turns per coil or 30 heavy copper conductors per slot and the starting winding of the same motor would have, for example, 22 turns of light copper conductors distributed in a conventional fashion. When this conventional type of motor is rewound in accordance with this disclosure, it might employ, for example, 23 turns per coil in the $a$ winding and 7 turns per coil in the $b$ winding or 30 turns of heavy copper running winding. The $c$ windings might operate satisfactorily with, for example, 8 conductors which would be placed in only two slots per pole. Thus the rewound motor would have the slots approximately ⅔ full as compared to the conventional type of motor providing the same general performance. Generally, advantage is taken of this condition by increasing the size of the copper to improve the motor efficiency. It will be evident, however, that in no case would the amount of copper contained within the windings be more than the amount of copper contained in conventional windings.

It follows from the foregoing that in this type of motor the torque does not fall off during acceleration even when the motor is starting under a relatively heavy load. In conventional forms of the motors, the starting windings are of very fine wire section and heat rapidly. Sometimes the heating rate of these windings is as high as 100° centigrade per second. It will be evident that internal heating such as this will result in a severe falling off of torque during acceleration. Thus the motor described herein which does not employ any fine wire winding sections is not subject to excessive heating upon starting in the same manner as is a conventional type of motor and thus the "pull-up" torque during starting does not drop off even the motor is starting under a heavy load. It will be evident that this is a highly desirable characteristic.

It should be noted that the removal of the short-circuit by the opening of the contact in the short-circuit lead 8 or 18 is not accompanied by the liberation of an appreciable amount of energy at the switch contacts as is true of a standard motor and of motors generally of the type disclosed in my above copending patent application. The reason for this is that the energy which would otherwise be lost is in this motor transferred through the mutual linkages from one part of the circuit to another. Hence this type of motor produces a minimum of line disturbance upon starting and disturbances to other equipment such as radios or television sets on the same line with a motor constructed in accordance with this invention are substantially completely avoided.

An additional advantage of this energy transfer resides in the fact that the higher value of current can be handled in the short-circuit line and by the contact switches without danger of damaging the contacts. Thus, where a standard form of motor is limited to about 30 amperes opening duty for the starting winding disconnect switch the improved motor disclosed herein may be safely arranged with the same contacts interrupting approximately twice this value.

With regard to the winding arrangements shown in Figure 1 and Figure 3, a motor employing the winding arrangement shown in Figure 1 can be built with a lesser number of turns in the *a* and *b* windings than a motor wound in accordance with the arrangement shown in Figure 3 for the reason that in the Figure 1 winding the *c* winding is restored to the circuit during running operation of the motor and serves as a part of the main winding. It will be evident, of course, that different currents exist in the short-circuited windings of the arrangements shown in Figure 1 and Figure 3 during starting and for certain applications these current values may be desirably selected in consideration of the location of the switching relay 36 in the circuit and the operation thereof. A disadvantage inherent in the arrangement shown in Figure 3 resides in the fact that the current in the short-circuited windings is somewhat higher than the current in the short-circuited windings of Figure 1. This increased current does not, however, substantially increase the load on the switching device inasmuch as there still remains a transfer of energy during the switching operation which has been noted above and thus the energy of the short-circuited windings is dissipated into the running windings and is not interrupted by the switching means.

What is claimed is:

1. A self-starting single phase electric motor comprising a rotor member and a stator member, one of said members including means for the reception of motor windings, a first winding comprising a plurality of coils in series arrangement positioned in said receiving means, a second winding comprising a plurality of coils in series arrangement positioned in said receiving means and displaced from coils of said first winding, one end of said second winding being connected to said first winding intermediate to the ends thereof and the other end of said second winding being connected to one end of said first winding, coils of said first winding on one side of said intermediate connection being in mutually inductive relation with coils of said first winding on the other side of said intermediate connection, and means for connecting a source of power across said first and second windings in series during running operation of the motor.

2. A self-starting single phase electric motor comprising a rotor member and a stator member, one of said members including means for the reception of motor windings, a first winding comprising a plurality of coils in series arrangement positioned in said receiving means, a second winding comprising a plurality of coils in series arrangement positioned in said receiving means and displaced from coils of said first winding, one end of said second winding being connected to said first winding intermediate to the ends thereof and the other end of said second winding being connected to one end of said first winding thus placing coils of said first winding in parallel connection with said second winding, coils of said first winding on one side of said intermediate connection being in mutually inductive relation with coils of said first winding on the other side of said intermediate connection, and means for connecting a source of power across said first and second windings in series and for opening said parallel connection during running operation of the motor.

3. A self-starting single phase electric motor comprising a rotor member and a stator member, one of said members including means for the reception of windings, a first winding having coils positioned in said receiving means, a second winding having coils positioned in said receiving means, coils of the second winding being in mutually inductive relation with coils of said first winding, a third winding having coils positioned in said receiving means displaced from the coils of said first winding, means for connecting said first, second and third windings in series, and for connecting said second and third windings in parallel during motor starting, and means for applying a potential across said first winding during motor starting and across said first and second windings in series during normal running operation of the motor, the mutually inductive coils of said first and second windings having relative numbers of turns inducing through transformer action a circulating current in said second and third windings displaced from the current in the first winding when the potential is applied across said first winding during motor starting.

4. A self-starting single phase electric motor comprising a rotor member and a stator member, one of said members including means for the reception of windings, a first winding having coils positioned in said receiving means, a second winding having coils positioned in said receiving means, coils of the second winding being in mutually inductive relation with coils of said first winding, a third winding having coils positioned in said receiving means displaced from the coils of said first winding, means for connecting said first, second and third windings in series, and for connecting said second and third windings in parallel during motor starting, and means for applying a potential across said first winding during motor starting and across said first, second and third windings in series during normal running operation of the motor, the mutually inductive coils of said first and second windings having relative numbers of turns inducing through transformer action a circulating current in said second and third windings displaced from the current in the first winding when the potential is applied across said first winding during motor starting.

5. A self-starting single phase electric motor comprising a rotor member and a stator member, one of said members including means for the reception of windings, a first winding having coils positioned in said receiving means, a second winding having coils positioned in said receiving means, coils of the second winding being in mutually inductive relation with coils of said first winding, a third winding having coils positioned in said receiving means displaced from the coils of said first winding, means connecting said first, second and third windings in series and for short-circuiting said second and third windings during motor starting, means for interrupting said short-circuit when the motor speed approaches normal operating speed, and means for connecting a source of power across at least said first and second windings in series during running operation of the motor, the mutually inductive coils of said first and second windings having relative numbers of turns inducing through transformer action a current in said second and third windings displaced from the current in the first winding when a potential is applied across said first winding and said short-circuit is not interrupted.

6. A self-starting single phase electric motor comprising a rotor member and a stator member, one of said members including means for the reception of windings, a first winding having coils positioned in said receiving means, a second winding having coils positioned in said receiving means, coils of the second winding being in mutually inductive relation with coils of said first winding and being distributed over the same winding axis therewith, a third winding having coils positioned in said receiving means displaced approximately 90 electrical degrees from the coils of said first winding, means connecting said first, second and third windings in series, means for short-circuiting said second and third windings during motor starting, means for interrupting said short-circuit when the motor speed approaches normal operating speed, and means for connecting a source of power across at least said first and second windings in series during running operation of the motor, the mutually inductive coils of said first and second windings having relative numbers of turns inducing through transformer action a current in said second and third windings displaced from the current in the first winding when a potential is applied across said first winding and said short-circuit is not interrupted.

References Cited in the file of this patent

UNITED STATES PATENTS

| | | | |
|---|---|---|---|
| 1,894,124 | Schaefer | Jan. 10, | 1933 |
| 2,057,502 | Horning | Oct. 13, | 1936 |
| 2,094,512 | Whitby | Sept. 28, | 1937 |
| 2,262,870 | Veinott et al. | Nov. 18, | 1941 |
| 2,462,184 | Hathaway et al. | Feb. 22, | 1949 |
| 2,464,756 | Trickey | Mar. 15, | 1949 |